(12) United States Patent
Ito

(10) Patent No.: US 7,489,776 B2
(45) Date of Patent: Feb. 10, 2009

(54) FACSIMILE APPARATUS

(75) Inventor: Tomohiro Ito, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 376 days.

(21) Appl. No.: 10/910,420

(22) Filed: Aug. 4, 2004

(65) Prior Publication Data

US 2005/0031098 A1 Feb. 10, 2005

(30) Foreign Application Priority Data

Aug. 7, 2003 (JP) ............................. 2003-288889

(51) Int. Cl.
*H04M 1/00* (2006.01)
(52) U.S. Cl. ................................. 379/399.01
(58) Field of Classification Search ............. 379/399.01
See application file for complete search history.

(56) References Cited

U.S. PATENT DOCUMENTS 5,347,572 A * 9/1994 Avni ........................ 379/93.17
5,500,895 A * 3/1996 Yurgelites ................... 379/412
7,050,577 B2 * 5/2006 Enriquez et al. ............. 379/413
2003/0048483 A1* 3/2003 Okabe ........................ 358/400

FOREIGN PATENT DOCUMENTS

| JP | A 8-251279 | 9/1996 |
| JP | A 2002-171360 | 6/2002 |
| JP | A 2003-51926 | 2/2003 |

* cited by examiner

Primary Examiner—Ramnandan Singh
(74) Attorney, Agent, or Firm—Oliff & Berridge, PLC (57) ABSTRACT

A facsimile apparatus, to which an external telephone enables to be connected through a line, has a line I/F section that transfers and receives signal through a network, a voltage detection section that is provided in a semiconductor DAA and detects a line voltage of the line, an adjustment section that adjusts a line voltage during establishment of a connection through the line so as to be within a predetermined voltage, and an external telephone monitor section that acquires a value of the line voltage detected by the voltage detection section at regular time intervals and monitors a use state of the external telephone based on the acquired values of the line voltage.

10 Claims, 6 Drawing Sheets

FACSIMILE APPARATUS

BACKGROUND OF THE INVENTION

1. Field of the Invention

This invention relates to a facsimile apparatus and in particular to a facsimile apparatus that monitors the use state of an external telephone using a voltage detection circuit incorporated in a semiconductor DAA.

2. Description of the Related Art

In recent years, it is known that a semiconductor data access arrangement (DAA) is used for an interface (I/F) section with a telephone line for the purpose of miniaturizing a facsimile apparatus. A use method of connecting an external telephone to a facsimile apparatus and sharing the same telephone line between the facsimile apparatus and the external telephone is also known. To detect hookup of the external telephone, hitherto, a current detector has been installed between the external telephone and the telephone line. That is, if a DC circuit is closed in conjunction with hookup, a DC loop current flows and thus the current detector is installed between a network and the external telephone to detect the DC loop current and hookup of the external telephone (Refer to JP-A-2003-51926 and US 2003/0048483 A1).

JP-A-2003-51926 (especially [0026]) is referred to as a related art.

The semiconductor DAA used in the I/F section incorporates a voltage detection circuit, and the line voltage when a connection is established, detected by the voltage detection circuit is adjusted so as to become within the range predetermined according to the standard. On the other hand, it is desirable that parts that can be omitted should be omitted as much as possible for miniaturizing the facsimile apparatus and reducing the costs thereof.

SUMMARY OF THE INVENTION

As a result of making various examinations based on the circumstances described above, it is found out that a voltage detection circuit incorporated in a semiconductor DAA to adjust the voltage current characteristics of the semiconductor DAA can be used to detect hookup or hook-down of an external telephone.

The object of the invention is to provide a facsimile apparatus that can monitor the use state of an external telephone using voltage detection section incorporated in a semiconductor DAA.

The invention provides a facsimile apparatus, to which an external telephone enables to be connected through a line, having: a line I/F section that transfers and receives signal through a network; a voltage detection section that is provided in a semiconductor DAA and detects a line voltage of the line; an adjustment section that adjusts a line voltage during establishment of a connection through the line so as to be within a predetermined voltage; and an external telephone monitor section that acquires a value of the line voltage detected by the voltage detection section at regular time intervals and monitors a use state of the external telephone based on the acquired value of the line voltage.

Therefore, since the line voltage detected by the voltage detection circuit provided in the semiconductor DAA is acquired at regular time intervals, the use state of the external telephone can be monitored based on the acquired value of the line voltage. Thus, the current detector installed between the network and the external telephone in order to monitor the use state of the external telephone in the related art is unnecessary to be provided. As a result, the miniaturization of the facsimile apparatus and the reduction of the costs thereof can be realized.

DETAILED DESCRIPTION OF THE PREFERRED EMBODIMENTS

Referring now to the accompanying drawings (FIGS. 1 to 6), there is shown a preferred embodiment of the invention.

Figure 1:
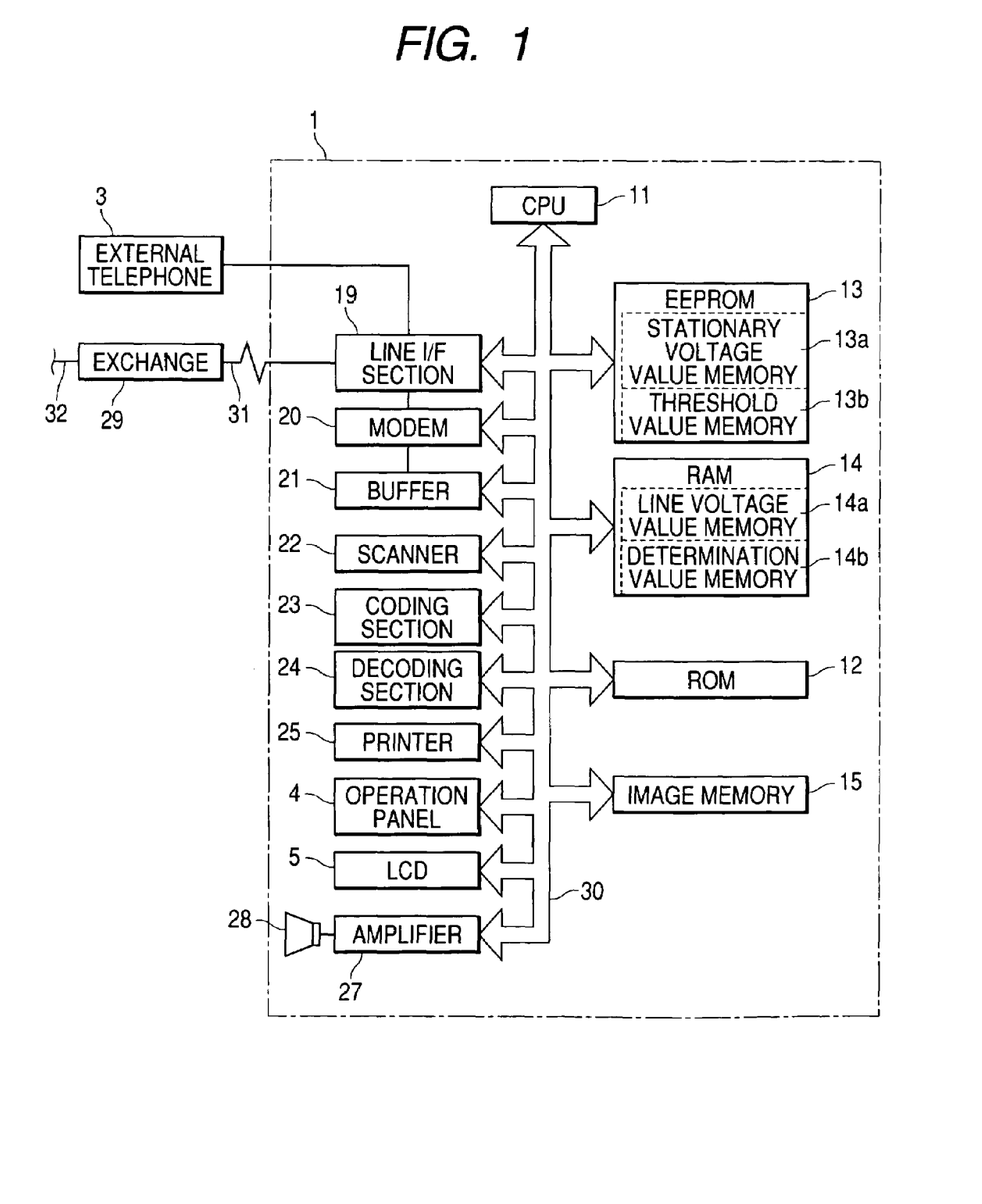
FIG. 1 is a block diagram to show the general configuration of a facsimile apparatus.

FIG. 1 is a block diagram to show the electric configuration of a facsimile apparatus 1. The facsimile apparatus 1 includes a CPU 11, ROM 12, EEPROM 13, RAM 14, image memory 15, a line I/F section 19, a modem 20, a buffer 21, a scanner 22, a coding section 23, a decoding section 24, a printer 25, an operation panel 4, an LCD 5, and an amplifier 27, which are connected to each other by a bus line 30.

Figure 2:
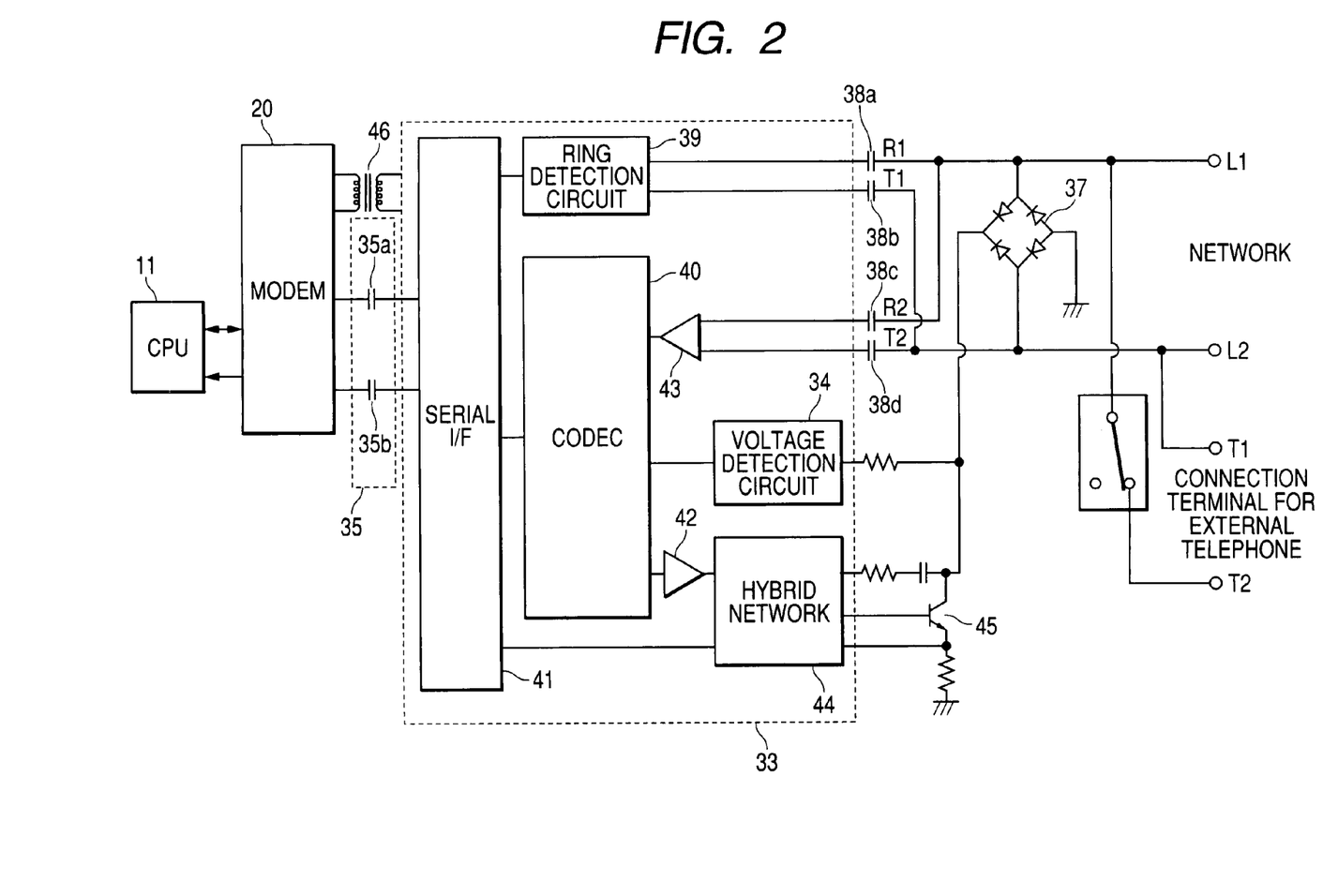
FIG. 2 is a block diagram to show the configuration of a line I/F section using a semiconductor DAA.

The line I/F section 19 is provided for performing line control, and has a semiconductor DAA 33 (see FIG. 2). The facsimile apparatus 1 is connected through the line I/F section 19 to a telephone line 31. The line I/F section 19 receives various signals such as a call signal (ring signal) sent from an exchange 29 and a signal indicating the telephone number of an opposite party machine (caller number), and transmits a dial signal at the calling time responsive to key operation on the operation panel 4 to the exchange 29. An external telephone 3 is connected via external telephone terminals T1 and T2.

Figure 3:
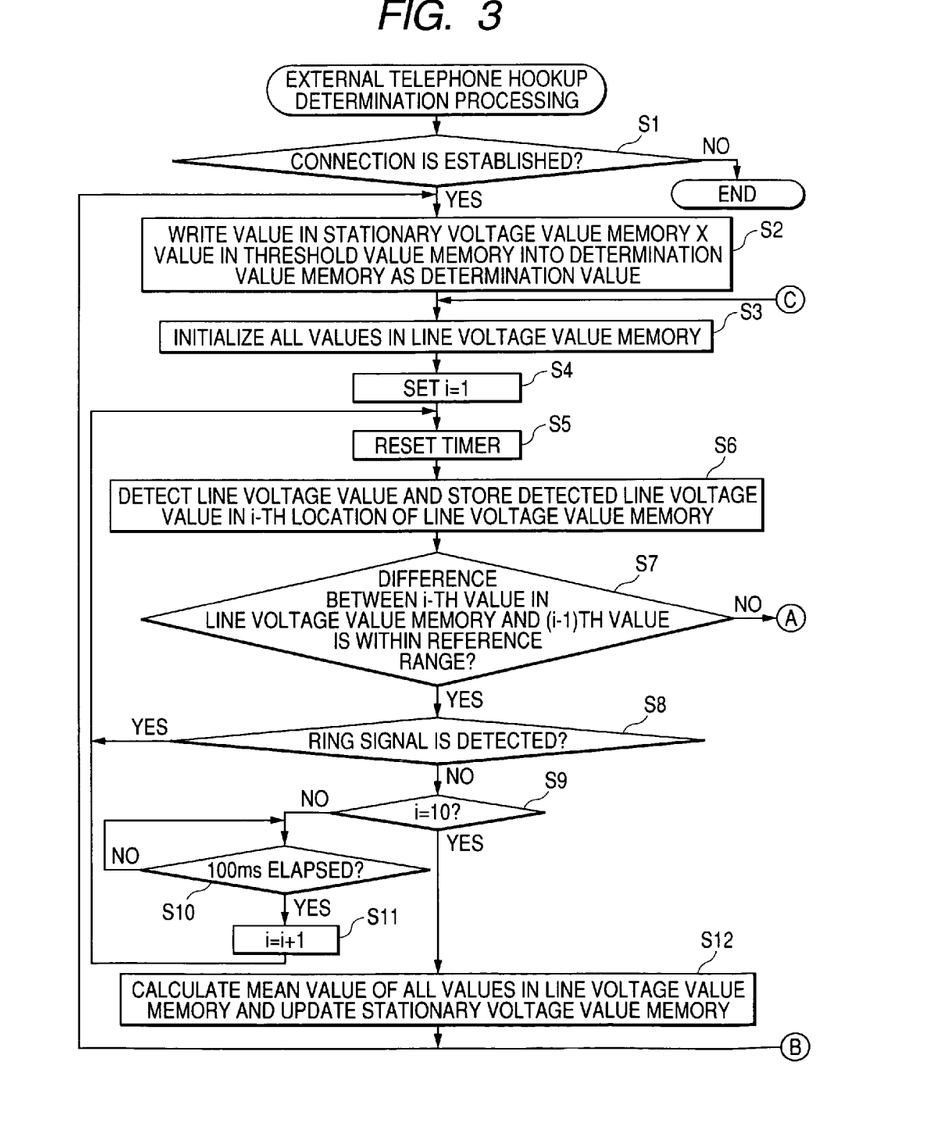
FIGS. 3 and 4 are flowcharts to show external telephone hookup determination processing executed in the facsimile apparatus.
Figure 4:
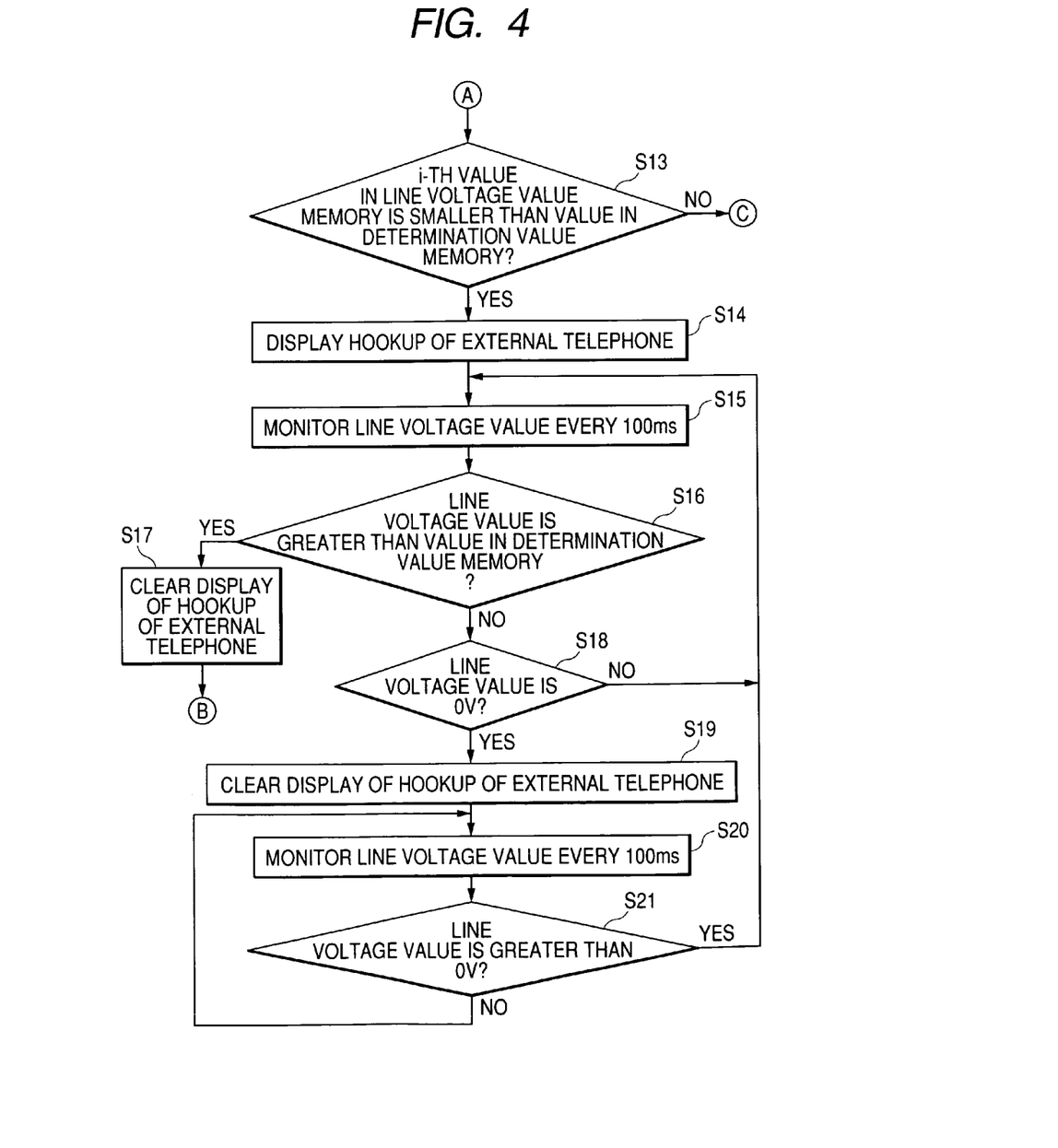
Figure 5:
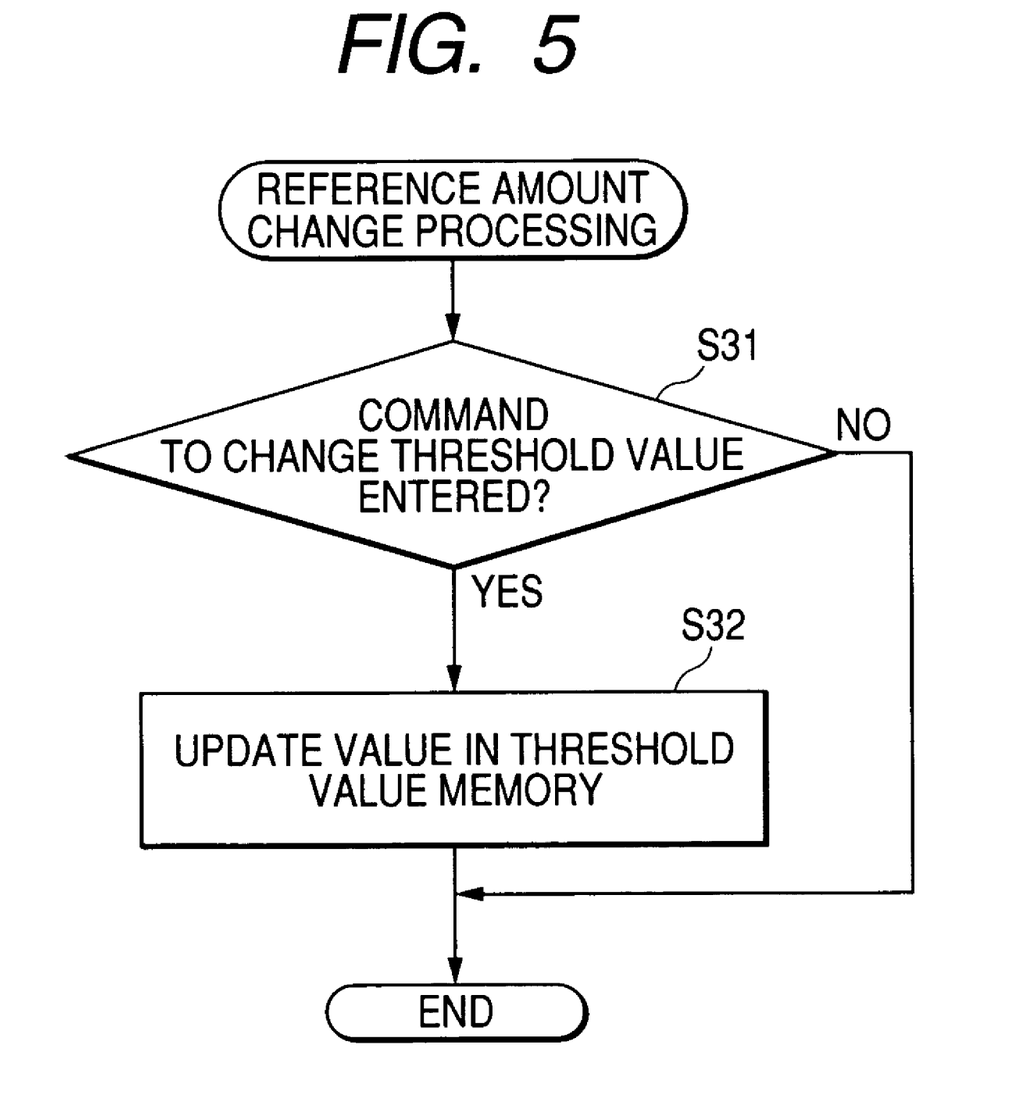
FIG. 5 is a flowchart to show reference value change processing executed in the facsimile apparatus.

The CPU 11 controls the sections connected by the bus line 30 in accordance with various signals transmitted and received through the line I/F section 19, and executes facsimile operation, namely, data communications. The ROM 12 is read-only memory storing a control program, etc., executed in the facsimile apparatus 1; the program shown in flowcharts of FIGS. 3, 4 and 5 is stored in the ROM 12.

The RAM 14 is memory for temporarily storing various pieces of data at the execution time of the operation of the facsimile apparatus 1, and includes line voltage value memory 14a and determination value memory 14b. The line voltage value memory 14a is memory for storing the value of the voltage supplied to the semiconductor DAA 33 when a connection is unestablished through the telephone line 31, namely, when a DC circuit for controlling a network is open in the semiconductor DAA 33. The line voltage value memory 14a stores the voltage values detected by a voltage detection circuit 34 when the connection is unestablished through the telephone line 31 in the detection order; in the embodiment, the memory can store 10 voltage values. The average value of the 10 voltage values stored in the line voltage value memory 14a is calculated as stationary voltage value Vr (see FIG. 6) in external telephone hookup determination processing later described with reference to FIGS. 3 and 4 and then the voltage values are cleared from the line voltage value memory 14a.

Figure 6:
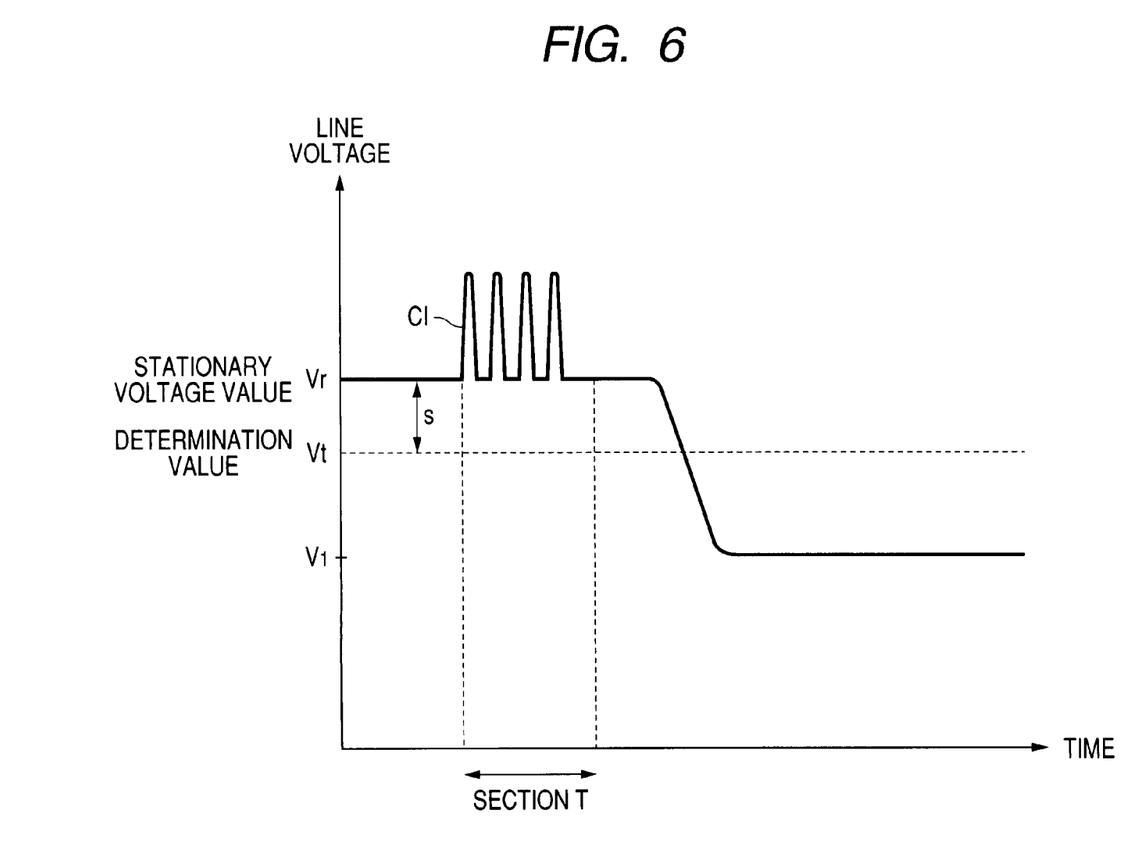
FIG. 6 is a graph to show the voltage value detected by a voltage detection circuit.

The determination value memory 14b is memory for storing a determination value Vt used as a determination reference value to determine whether the external telephone 3 is hooked up or down. The determination value Vt is a value smaller than the stationary voltage value Vr that is the average value of the voltage values when the connection is unestablished through the telephone line 31 by a predetermined reference amount s, as shown in FIG. 6. That is, if the external telephone 3 is hooked up, a hook switch (not shown) is turned on and DC circuit between the telephone line 31 and the external telephone 3 is closed and the voltage supplied to the semiconductor DAA 33 drops accordingly. Thus, if the voltage value detected by the voltage detection circuit 34 is smaller exceeding the predetermined reference amount s than the stationary voltage value Vr, it can be determined that the external telephone 3 is hooked up. The value stored in the determination value memory 14b is updated at regular time intervals while the connection is unestablished through the telephone line 31.

The EEPROM 13, which is electrically erasable programmable ROM, is nonvolatile memory and includes stationary voltage value memory 13a and threshold value memory 13b. The data stored in the EEPROM 13 is retained still after power of the facsimile apparatus 1 is turned off. The stationary voltage value memory 13a is memory for storing the stationary voltage value Vr of the average value of the 10 voltage values stored in the line voltage value memory 14a. When 10 voltage values are stored in the line voltage value memory 14a, the stationary voltage value memory 13a is updated according to the average value calculated from the 10 voltage values and thus is updated at regular time intervals while the connection is unestablished through the telephone line 31.

The threshold value memory 13b is memory for storing a threshold value used to calculate the determination value to determine whether or not the external telephone 3 is hooked up; an initial value of 0.8 is written into the memory at the manufacturing time. In the external telephone hookup determination processing later described with reference to FIGS. 3 and 4, the stationary voltage value Vr stored in the stationary voltage value memory 13a is multiplied by the threshold value stored in the threshold value memory 13b, for example, 0.8 to calculate the determination value Vt, and whether or not the external telephone 3 is hooked up is determined based on the determination value Vt. The value in the threshold value memory 13b can be updated according to the value entered by the user through the operation panel 4 in reference amount change processing later described with reference to FIG. 5. A value greater than 0 and equal to or less than 1 is used as the threshold value.

Thus, the determination value used as the determination reference to determine whether or not the external telephone 3 is hooked up is calculated by multiplying the value in the stationary voltage value memory 13a provided in the EEPROM 13 by the threshold value in the threshold value memory 13b provided in the EEPROM 13. Since the data stored in the EEPROM 13 is retained still after the power of the facsimile apparatus 1 is turned off, when the power is again turned on, the determination value to determine whether or not the external telephone 3 is hooked up is calculated based on the previous value in the stationary voltage value memory 13a and the previous value in the threshold value memory 13b.

The image memory 15 is memory for storing a communication history, image data, and a bit image for print; it is implemented as dynamic RAM (DRAM) of inexpensive large-capacity memory. Received image data is once stored in the image memory 15 and after the image data is printed on record paper on the printer 25, it is cleared from the image memory 15. The image data read through the scanner 22 is also stored in the image memory 15.

The modem 20 modulates and demodulates image information and communication data for transmission and also transmits and receives various procedure signals for transmission control. The buffer 21 temporarily stores data containing coded image information transmitted to and received from an opposite party machine.

The scanner 22 reads an original inserted into an original insertion slot as image data, and includes an original transport motor. The coding section 23 codes the image data read through the scanner 22. The decoding section 24 reads the image data stored in the buffer 21 or the image memory 15 and decodes the image data, and the provided data is printed on record paper on the printer 25. The printer 25 is implemented as an ink jet printer and includes a record paper transport motor for transporting record paper, a carriage motor for moving a carriage with a print head mounted thereon, and the print head for ejecting ink onto record paper. The amplifier 27 sounds a loudspeaker 28 connected to the amplifier 27 for outputting a ringing tone and voice.

The described facsimile apparatus 1 is connected to the telephone line 31 through the line I/F section 19. The telephone line 31 is connected to the exchange 29 of the facsimile apparatus 1, and the exchange 29 is connected to a different exchange via a telephone line 32. The different exchange is further connected to an opposite party machine via a telephone line or another machine as the transfer destination.

FIG. 2 is a block diagram to show the configuration of the line I/F section 19 having the semiconductor DAA 33. The semiconductor DAA 33 mainly has functions of line termination, hybrid, ringing detection, etc. An insulation section 35 for providing DC insulation between the semiconductor DAA 33 and the modem 20 and transmitting data, a signal, etc., intervenes between the semiconductor DAA 33 and the modem 20.

The line I/F section 19 includes a CML (Connect MODEM to Line) relay 36 for switching TEL to FAX, a rectifier 37, and DC loop cut capacitors 38a, 38b, 38c, 38d, etc., in addition to the semiconductor DAA 33. L1 and L2 are terminals to the telephone line 31, and T1 and T2 are terminals to the external telephone 3.

Since the semiconductor DAA 33 is provided with a CODEC 40 for performing A/D conversion and D/A conversion of FAX data, the insulation section 35 becomes digital transmission. Therefore, a high-insulation capacitor is used as the insulation section 35.

The CML relay 36 is set to the external telephone 3 side in a standby mode as shown in FIG. 2. When FAX communications start, the CPU 11 turns off a CML relay control signal for disconnecting the network from the external telephone 3 to prevent cross.

The rectifier 37 rectifies the polarity of a DC loop current of the network in one direction. Power of the semiconductor DAA 33 is supplied through a transformer 46 from the modem 20, and is rectified by the rectifier 37 to provide voltage of constant polarity regardless of the voltage polarity of the telephone line 31. The voltage detection circuit 34 detects the voltage value of the power rectified by the rectifier 37 and supplied to the semiconductor DAA 33, and is connected to a connection line connecting the rectifier 37 and a hybrid network 44 and a CODEC 40 as shown in FIG. 2. The detection result of the voltage detection circuit 34 is output from the semiconductor DAA 33 through the modem 20 to the CPU 11.

The hybrid network 44 establishes and cut off a connection with the network and is made up of a two-wire to four-wire conversion circuit for separating FAX data from the telephone line 31 into transmission/reception data, a canceller circuit for suppressing routing of transmission data to a reception path, a filter circuit, and the like. The network, the CODEC 40, a serial I/F 41, and ground are connected to the hybrid network 44 as shown in FIG. 2. A transmission amplifier 42 intervenes between the hybrid network 44 and the CODEC 40.

The CODEC 40 performs A/D conversion and D/A conversion of FAX reception data and transmission data. The network, the external telephone 3, the hybrid network 44, and the serial I/F 41 are connected to the CODEC 40 through the transmission amplifier 42 or a tone amplifier 43 as shown in FIG. 2.

The transmission amplifier 42 is provided for making gain adjustment of transmission data. The tone amplifier 43, which is a differential amplifier, is differential input to the terminals L1 and L2 of the telephone line 31.

When a tone signal comes in the CODEC 40 from the telephone line 31 or the external telephone 3, the tone signal flows through the tone amplifier 43, the CODEC 40, the serial I/F 41, the insulation section 35, and the modem 20 in order, and the CPU 11 detects a tone detection signal transmitted from the CODEC 40.

The ring detection circuit 39 is connected to the network, the external telephone 3, and the serial I/F 41 as shown in FIG. 2. When a ring signal comes in the ring detection circuit 39 from the telephone line 31, in the same cycle, a ringing detection signal makes a low to high transition or a high to low transition through the ring detection circuit 39, the serial I/F 41, and a capacitor 35a of the insulation section 35, whereby the signal is detected by the CPU 11 through the modem 20.

A transistor 45 is provided for adjusting the apparent resistance value of the semiconductor DAA 33 as the base potential is changed so that the line voltage when a connection is established, detected by the voltage detection circuit 34 becomes predetermined voltage current characteristic.

The serial I/F 41 collects signals such as the ringing detection signal from the ring detection circuit 39 and the FAX reception data from the CODEC 40 into serial data for a capacitor 35b of the insulation section 35 and on the other hand, separates a serial signal from the capacitor 35a of the insulation section 35 into a control signal for causing the semiconductor DAA 33 to establish and cut off a connection with the network through the telephone line 31 and FAX transmission data to the CODEC 40.

FIG. 6 is a graph to show the line voltage value detected by the voltage detection circuit 34. When a connection through the telephone line 31 is unestablished, the line voltage detected by the voltage detection circuit 34 is an almost constant value. The stationary voltage value Vr represents the average value of the 10 line voltage values detected every 100 milliseconds when the connection through the telephone line 31 is unestablished. The determination value Vt is calculated by multiplying the stationary voltage value Vr by a threshold value equal to or less than 1, and thus becomes a value lower than the stationary voltage value Vr by the predetermined reference amount S.

As the external telephone 3 is hooked up, a current flows into the external telephone 3 from the telephone line 31 and the voltage supplied to the semiconductor DAA 33 drops to V1. Then, the voltage value detected by the voltage detection circuit 34 lowers exceeding the predetermined reference amount s and becomes equal to or less than the determination value Vt, so that it can be determined that the external telephone 3 is hooked up.

Since the determination value Vt results from multiplying the stationary voltage value Vr by the value in the threshold value memory 13b, the reference amount s, the difference between the determination value Vt and the stationary voltage value Vr, is determined by the threshold value in the threshold value memory 13b. When the external telephone 3 is hooked up, the degree of the voltage drop of the line voltage value detected by the voltage detection circuit 34 changes depending on the internal resistance of the external telephone 3. Thus, in the embodiment, the reference amount s can be changed as the value in the threshold value memory 13b is changed in the reference amount change processing later described with reference to FIG. 5. If a ring signal is sent from the telephone line 31 at the state a connection through the telephone line 31 is unestablished, the line voltage value rises as indicated in amplitude CI in a section T in FIG. 6 and therefore the line voltage value in the ring signal detection period is excluded from calculation of the stationary voltage value Vr.

Next, processing of the described facsimile apparatus 1 will be discussed with reference to flowcharts of FIGS. 3, 4 and 5. The external telephone hookup determination processing in FIGS. 3 and 4 is processing executed while a connection through the telephone line 31 is unestablished, namely, while the DC circuit for controlling the operation of the network in the semiconductor DAA 33 is open. If the DC circuit is closed in the semiconductor DAA 33, the processing is exited.

As shown in FIG. 3, in the external telephone hookup determination processing, first whether or not a connection is established through the telephone line 31 is determined (S1). If the connection is established, for example, during FAX communications (No at S1), the external telephone hookup determination processing is terminated.

On the other hand, if the connection is not established, for example, during standby mode (Yes at S1), the stationary voltage value Vr stored in the stationary voltage value memory 13a is multiplied by the value in the threshold value memory 13b and the provided value is written into the determination value memory 14b as the determination value Vt (S2)

The average value of the 10 line voltage values previously detected is stored in the stationary voltage value memory 13a as the stationary voltage value Vr and a predetermined value equal to or less than 1, for example, 0.8 is stored in the threshold value memory 13b. Therefore, the determination value Vt stored in the determination value memory 14b becomes a value smaller than the stationary voltage value Vr as the average value of the voltage values previously detected by the predetermined reference amount s.

Next, the line voltage value memory 14a is initialized to clear all the 10 voltage values stored in the line voltage value memory 14a (S3). Subsequently, variable i is set to 1 (S4) and a timer is reset to 0 (S5).

Subsequently, the line voltage value detected by the voltage detection circuit 34 is stored in the i-th location of the line voltage value memory 14a (S6). Next, whether or not the difference between the i-th value in the line voltage value memory 14a and the (i-1)st value is within a reference range is checked (S7). That is, whether or not the current detected line voltage value changes largely exceeding the reference range as compared with the previously detected line voltage value is determined. The reference range is, for example, the range of ±1.5 V, and is stored in the ROM 12.

If the difference between the i-th value in the line voltage value memory 14a and the (i-1)st value is within the reference range (Yes at S7), the voltage value change is variation within the allowable range caused by small noise or fluctuation or the like. Then, the process goes to S8 and whether or not a ring signal is being detected is checked. If a ring signal is being detected (Yes at S8), the line voltage value rises also shown in FIG. 6 and therefore is not stored in the line voltage value memory 14a and the process returns to S5.

On the other hand, if a ring signal is not being detected (No at S8), whether or not the line voltage value has been detected a predetermined number of times is checked based on whether or not the variable i is 10 (S9). If the variable i is not 10 (No at S9), whether or not a predetermined time interval has elapsed since acquisition of the current line voltage value is checked based on whether or not the value of the timer reaches 100 milliseconds (S10). If the value of the timer does not reach 100 milliseconds, namely, if the predetermined time interval has not elapsed since detection of the current line voltage value (No at S10), the standby mode is entered. On the other hand, if the predetermined time interval has elapsed since detection of the current line voltage value (Yes at S10), one is added to the variable i (S11) and the process returns to S5.

In the embodiment, the predetermined time interval section the time interval between detection of the current line voltage value and detection of the next line voltage value; for example, it is 100 milliseconds. In the embodiment, the predetermined number of times section the number of times the line voltage value is detected by the time the stationary voltage value Vr is calculated; for example, it is 10.

If it is determined that the variable i is 10 (Yes at S9), the average value of the 10 values in the line voltage value memory 14a is calculated and the stationary voltage value memory 13a is updated using the average value as the stationary voltage value Vr (S12) and the process returns to S2. Therefore, at S2, the determination value Vt is updated based on the stationary voltage value Vr calculated from the current acquired line voltage value.

If the difference between the i-th value in the line voltage value memory 14a and the (i-1)st value exceeds the reference range (No at S7), whether or not the i-th line voltage value is smaller than the determination value Vt stored in the determination value memory 14b is checked (S13). If the i-th line voltage value in the line voltage value memory 14a is greater than the determination value Vt (No at S13), the voltage value fluctuation is caused, for example, by large noise, such as crosstalk or cross, and therefore the process returns to S3. However, if the i-th line voltage value in the line voltage value memory 14a is smaller than the determination value Vt (Yes at S13), it is determined that the voltage drops as the external telephone 3 is hooked up. Hookup of the external telephone 3 is displayed on the LCD 5 of the facsimile apparatus 1 (S14).

Subsequently, the line voltage value detected by the voltage detection circuit 34 is monitored every 100 milliseconds (S15) and if the value is greater than the determination value Vt stored in the determination value memory 14b (Yes at S16), it can be determined that the line voltage value rises as the external telephone 3 is hooked down. Thus, the display to the effect that the external telephone 3 is hooked up is cleared on the LCD 5 of the facsimile apparatus 1 (S17).

On the other hand, if the line voltage value detected by the voltage detection circuit 34 is determined to be smaller than the determination value Vt stored in the determination value memory 14b (No at S16), whether or not the line voltage value is 0 V is checked (S18). If the line voltage value is not 0 V (No at S18), the process returns to S15. If the line voltage value detected by the voltage detection circuit 34 is 0 V (Yes at S18), it can be determined that the telephone line 31 is drawn out from the facsimile apparatus 1. Then, the display to the effect that the external telephone 3 is hooked up is cleared on the LCD 5 of the facsimile apparatus 1, and display or sound is produced to notify the user that the telephone line 31 is drawn out (Sl9). The line voltage value detected by the voltage detection circuit 34 is monitored every 100 milliseconds (S20) and whether or not the line voltage value is greater than 0 V is checked (S21). If the line voltage value is not greater than 0 V (No at S21), the telephone line 31 remains drawn out from the facsimile apparatus 1 and thus the standby mode is entered. If the line voltage value detected by the voltage detection circuit 34 is greater than 0 V (Yes at S21), it can be determined that the facsimile apparatus 1 and the telephone line 31 are again connected and voltage is supplied to the semiconductor DAA 33. Thus, the process returns to S15.

For example, when the line voltage fluctuates due to noise, etc., with the external telephone 3 hooked up, if the stationary voltage value Vr is updated based on the line voltage value when the external telephone 3 is hooked up, for example, the value as much as V1 shown in FIG. 6, the determination value Vt is updated based on the improper stationary voltage value Vr; this is disadvantageous. Then, in the embodiment, after hookup of the external telephone 3 is once displayed, the determination value Vt is not updated until it is determined that the external telephone 3 is hooked down.

Next, the reference amount change processing will be discussed with reference to FIG. 5. This reference value change processing is started every predetermined time interval. First, whether or not a command to change the threshold value is entered through the operation panel 4 is checked (S31). If a command to change the threshold value is not entered (No at S31), the processing is terminated; if a command to change the threshold value is entered (Yes at S31), the value in the threshold value memory 13b is updated with the value entered through the operation panel 4 (S32). The determination value for determining whether or not the external telephone 3 is hooked up is determined by multiplying the stationary voltage value Vr by the threshold value, as described above. Therefore, as the value in the threshold value memory 13b is changed, the reference amount s (see FIG. 6) can also be changed. The reference amount s needs to be a value considering the lowering amount of the line voltage value as the external telephone 3 is hooked up; since the degree of the voltage drop when the external telephone 3 is hooked up may vary depending on the internal resistance of the external telephone 3, the user is allowed to set any desired reference amount s by changing the value in the threshold value memory 13b.

According to the facsimile apparatus 1 of the embodiment, since the line voltage detected by the voltage detection circuit 34 provided in the semiconductor DAA 33 is acquired at regular time intervals, the use state of the external telephone 3 can be monitored based on the acquired value of the line voltage (S13, S16, S21). Thus, the current detector installed between the network and the external telephone 3 in order to monitor the use state of the external telephone 3 in the related art is unnecessary to be provided. As a result, the miniaturization of the facsimile apparatus 1 and the reduction of the costs thereof can be realized.

According to the facsimile apparatus 1 of the embodiment, if the line voltage detected by the voltage detection circuit 34 is equal to or less than the preset determination value, the external telephone monitor section (S13) determines that the external telephone is hooked up (S14), so that it can be appropriately determined that the external telephone 3 is hooked up. That is, when the external telephone 3 is hooked up, a current flows into the external telephone 3 from the line and the voltage detected by the voltage detection circuit 34 provided in the semiconductor DAA 33 drops. Thus, if the line voltage detected by the voltage detection circuit 34 is equal to or less than the predetermined determination value, it can be easily determined that the external telephone 3 is hooked up.

According to the facsimile apparatus 1 of the embodiment, if the line voltage detected by the voltage detection circuit 34 is equal to or less than the determination value Vt which is smaller than the stationary voltage value Vr when a connection through the telephone line 31 is unestablished, it is determined that the external telephone 3 is hooked up. Thus, for example, even if the line voltage changes depending on the country or the region where the facsimile apparatus is installed, the line use environment, or the like, it can be appropriately determined that the external telephone 3 is hooked up regardless of the country, the region or the environment if the line voltage when the connection is established through the telephone line 31 (stationary voltage) can be acquired.

According to the facsimile apparatus 1 of the embodiment, the line voltage is detected the predetermined successive times at predetermined time intervals while a connection is unestablished through the telephone line 31, and the average value of the line voltages is determined to be the stationary voltage value Vr. Thus, if the line voltage (stationary voltage) changes depending on the country or the region where the facsimile apparatus is installed, the line use environment, or the like, it can be detected by the machine and automatically the line voltage (stationary voltage) can be acquired. Thus, an appropriate value can be determined as the determination value to determine the use state of the external telephone 3 and it can be appropriately detected that the external telephone 3 is hooked up independently of the country, the region, or the environment in which the facsimile apparatus is installed.

According to the facsimile apparatus 1 of the embodiment, the stationary voltage determination section (S3 to S12) determines whether or not the difference from the last value of the line voltage is within the reference range every time the voltage detection circuit 34 detects the line voltage, and determines the average value of line voltages within the reference range as the stationary voltage if the line voltages within the reference range is detected the predetermined successive times. Thus, even if the line voltage temporarily fluctuates due to crosstalk (cross), etc., the precise line voltage can be acquired and an appropriate value can be determined as the determination value Vt to determine the use state of the external telephone 3.

According to the facsimile apparatus 1 of the embodiment, every time the stationary voltage determination section (S3 to S12) determines a new stationary voltage value Vr, the determination value setting section (S2) updates the determination value Vt. Thus, if a connection is changed to a network different in line voltage (for example, change from a connection to public switched telephone network (PSTN) in which the line voltage is 48 V to another connection for private branch exchange (PBX), ISDN, Internet protocol telephone (IP telephone)), the facsimile apparatus can always determine whether the external telephone 3 is hooked up or down based on the appropriate determination value Vt.

According to the facsimile apparatus 1 of the embodiment, if the stationary voltage determination section (S3 to S12) determines that the difference from the last value of the line voltage is within the reference range (S7), the external telephone monitor section (S13) determines whether or not the line voltage detected by the voltage detection circuit 34 is equal to or less than the determination value Vt and determines that the external telephone 3 is hooked up (S14) if the line voltage is equal to or less than the determination value Vt. Thus, even while the stationary voltage determination section (S3 to S12) determines the stationary voltage value Vr, the use state of the external telephone 3 can be monitored. Thus, the use state of the external telephone 3 can be monitored continuously without involving the time period in which the use state of the external telephone 3 cannot be monitored to determine the stationary voltage value Vr.

According to the facsimile apparatus 1 of the embodiment, the external telephone monitor section (S16, S21) continues to acquire a value of the line voltage still after the external telephone monitor section determines that the external telephone 3 is hooked up and determines that the external telephone 3 is hooked down if the line voltage is greater than the determination value Vt, and the stationary voltage determination section (S3 to S12) does not determine the stationary voltage (S12) until the external telephone monitor section (S16) determines that the external telephone 3 is hooked down. Thus, the determination value Vt is always updated based on the line voltage detected with the external telephone 3 hooked down (S2). Thus, since the determination value Vt is always updated based on the line voltage detected with the external telephone 3 hooked down, the use state of the external telephone 3 can be monitored based on the appropriate determination value Vt.

According to the facsimile apparatus 1 of the embodiment, the stationary voltage determination section (S3 to S12) does not determine the stationary voltage (S12) while a ring signal transmitted through the telephone line 31 is detected. Thus, the determination value Vt can be prevented from being updated based on the voltage value higher than the usual voltage value in a state where the line voltage rises and high voltage is supplied to the semiconductor DAA 33 as the ring signal receives. Thus, an appropriate determination value Vt can be determined and whether the external telephone 3 is hooked up or down can be determined appropriately.

According to the facsimile apparatus 1 of the embodiment, since the determination value Vt is variable, the determination value Vt can be set (S32) in response to the internal resistance of each external telephone. As a result, the use state of the external telephone can be monitored appropriately, and the determination value Vt can be set to a more appropriate value for the environment in which the facsimile apparatus is installed.

Although the invention has been described based on the embodiments, it is to be understood that the invention is not limited to the specific embodiments thereof and modifications and changes may be made without departing from the spirit and scope of the invention.

For example, in the embodiment, the line voltage is detected 10 successive times every 100 milliseconds, thereby determining the stationary voltage value of the line voltage, but the time interval (predetermined time interval) and the number of times (predetermined number of times) can be defined appropriately.

What is claimed is:

1. A facsimile apparatus, to which an external telephone enables to be connected through a line, comprising:
    a line interface (I/F) section that transfers and receives signal through a network;
    a voltage detection section that is provided in a semiconductor data access arrangement (DAA) and detects a line voltage of the line;

an adjustment section that adjusts a line voltage during establishment of a connection through the line so as to be within a predetermined voltage; and an external telephone monitor section that acquires a value of the line voltage detected by the voltage detection section at regular time intervals and monitors a use state of the external telephone based on the acquired value of the line voltage.

2. The facsimile apparatus according to claim 1, wherein if the line voltage detected by the voltage detection section is equal to or less than a predetermined determination value, the external telephone monitor section determines that the external telephone is hooked up.

3. The facsimile apparatus according to claim 2, further comprising:

a stationary voltage determination section that determines a stationary voltage of the line voltage at unestablishment of a connection through the line based on values of the line voltage detected by the voltage detection section during the unestablishment of a connection; and a determination value setting section that sets a value smaller than the stationary voltage as the determination value.

4. The facsimile apparatus according to claim 3, wherein the stationary voltage determination section determines an average value of line voltages detected predetermined successive times at predetermined time intervals by the voltage detection section while a connection is unestablished through the line as the stationary voltage.

5. The facsimile apparatus according to claim 4, wherein the stationary voltage determination section determines whether or not a difference from last value of the line voltage is within a reference range every time the voltage detection section detects line voltage, and determines an average value of line voltages within the reference range as the stationary voltage if the line voltages within the reference range is detected the predetermined successive times.

6. The facsimile apparatus according to claim 5, wherein if the stationary voltage determination section determines that the difference from last value of the line voltage is within the reference range, the external telephone monitor section determines whether or not the line voltage detected by the voltage detection section is equal to or less than the determination value and determines that the external telephone is hooked up if the line voltage is equal to or less than the determination value.

7. The facsimile apparatus according to claim 3, wherein every time the stationary voltage determination section determines a new stationary voltage, the determination value setting section updates the determination value.

8. The facsimile apparatus according to claim 3, wherein the external telephone monitor section continues to acquire a value of the line voltage still after the external telephone monitor section determines that the external telephone is hooked up and determines that the external telephone is hooked down if the line voltage is greater than the determination value, and the stationary voltage determination section does not determine the stationary voltage until the external telephone monitor section determines that the external telephone is hooked down.

9. The facsimile apparatus according to claim 3, wherein the stationary voltage determination section does not determine the stationary voltage while a ring signal transmitted through the network is detected.

10. The facsimile apparatus according to claim 3, wherein the determination value is variable.

\* \* \* \* \*